United States Patent

[11] 3,600,934

[72] Inventors Donald E. Hendrix;
Harold A. Kermicle, both of Oak Ridge, Tenn.
[21] Appl. No. 887,695
[22] Filed Dec. 23, 1969
[45] Patented Aug. 24, 1971
[73] Assignee The United States of America as represented by the United States Atomic Energy Commission

[54] EDDY CURRENT SYSTEM FOR VIBRATION TESTING OF CANTILEVERED NONFERROUS ARTICLES
4 Claims, 2 Drawing Figs.
[52] U.S. Cl. .................................................. 73/67.2, 73/67.3
[51] Int. Cl. .......................................... G01n 24/00
[50] Field of Search .......................................... 73/67.2, 505, 517 AV, 67.1, 67.4, 71.5; 310/13, 27, 25

[56] References Cited
UNITED STATES PATENTS
| | | | |
|---|---|---|---|
| 2,403,999 | 7/1946 | Read et al. | 73/67.2 |
| 3,198,019 | 8/1965 | Mullins et al. | 73/505 |
| 3,374,662 | 3/1968 | Achter et al. | 73/67.4 |

Primary Examiner—Richard C. Queisser
Assistant Examiner—Arthur E. Korkosz
Attorney—Roland A. Anderson ABSTRACT: An eddy current-induced vibration testing device has been provided which maintains self-excited resonant frequency vibrations in cantilevered articles such as compressor blades. The device automatically controls the amplitude of vibration of the blade and is capable of controlling the amplitude within a wide range for nondestructive testing and is further capable of driving the blade to destruction by fatigue.

INVENTORS.
Donald E. Hendrix
Harold A. Kermicle

ATTORNEY.

EDDY CURRENT SYSTEM FOR VIBRATION TESTING OF CANTILEVERED NONFERROUS ARTICLES

BACKGROUND OF THE INVENTION

The present invention was made during the course of, or under, a contract with the U.S. Atomic Energy Commission.

This invention relates to vibration testing devices and more specifically to devices for testing of nonferrous cantilevered articles by eddy current-induced vibration.

In the art of vibration testing cantilevered articles, various devices have been provided for use in both destructive and nondestructive testing modes to determine structural quality and to characterize blade spectra. Meaningful vibration tests of blades for machines, such as gas turbines, axial compressors, etc., prior to final design or installation is very important because the loss of a single blade in service can result in ruinous deblading of an entire machine before it is shut down. From the standpoint of economy, it is desirable that such shutdowns be kept to a minimum, and this can only be accomplished by ensuring that the blades are structurally sound before installation or use.

Observations of fatigue crack locations in various blades removed from service have shown evidence of resonant vibration in a bending mode, and other blades exhibited fatigue damage from torsional vibration resonance. Additionally, it is known that in compressor blading several natural modes of vibration are capable of relatively easy excitation.

Accordingly, a means has been sought by which to perform a comprehensive analysis of blade excitation characteristics. Knowledge of the resonance characteristics in the operating compressors would serve as an aid to compressor design permitting necessary alteration in the blade natural frequencies.

The ideal vibration testing system should be capable of producing nondestructive resonant frequency characterization tests and should also permit driving a test blade to destruction in resonant modes if desired. The destructive test demands the transmittal of sufficient power to drive the sample to destruction. In addition, the driver unit must be capable of operation at high temperatures for elevated temperature tests. In using the prior art methods it is difficult to transmit enough controlled force to the article under vibrational test to carry out convenient and effective fatigue tests.

Previously known methods of blade testing include various mechanical and pneumatic methods of fatigue testing. One specific example is illustrated in U.S. Pat. No. 3,023,610 for "A Method Of And Apparatus For Carrying Out Fatigue Tests of Turbine Blades" issued to M. Prochazka, Mar. 6, 1962. In this example a blade is subjected to flexural vibrations by being connected to a cantilevered carrier arm rigidly fixed at one end to a high mass mounting base. The carrier has a far greater natural frequency of flexural vibration than the test specimens. A small amplitude vibration of the carrier arm at a frequency far below its natural frequency induces free (natural resonance) vibrations in the test specimens. The amplitude is then controlled on a smaller scale in that it does not require as much power to drive the carrier arm as compared to direct magnetic field driven vibration of the test specimen.

The disadvantage with this system is that, since the energy is applied to a carrier arm rather than he blade itself, it is less representative of the actual conditions as they exist in compressors. Although Prochazka's device requires less energy to vibrate the blade, it would be very difficult to control the power input to maintain a preset deflection amplitude. Further, the Prochazka device is only useful for bending mode vibrational testing.

A pneumatic device is illustrated in U.S. Pat No. 3,005,334 for "Apparatus for Nondestructive Inspection of Cantilevered Members" issued to E. R. Taylor et al., Oct. 24, 1961. Here the vibration amplitude is controlled by a regulated source of pressurized air directed onto the cantilever mounted blade through a nozzle. A similar arrangement has been used which utilizes high level audio sound waves from a horn loudspeaker of adjustable frequency directed against a surface of the test specimen. Both of these methods are noisy in operation and, in addition, do not allow a very close control of blade vibrations or blade temperature.

Eddy current methods are also know in the art with similar feedback controls to maintain any self-excited resonance of the test sample as in the methods discussed above. An oscilloscope or frequency counter is used to sense the resonant frequency of the test specimen. A small shift in the natural resonant frequency to a lower value is interpreted as the developing of a fatigue crack, thereby identifying a blade unsuitable for service. A disadvantage with this system is that an accelerometer attached to the blade mount serves as the vibration sensor. Amplitude is controlled as a function of energy absorbed in the mount and may not be representative of blade deflection.

SUMMARY OF THE INVENTION

It is one object of this invention to provide eddy current vibration apparatus for vibration testing of cantilevered articles which has improved control of vibration amplitude of the specimen under test.

It is another object of this invention to provide an eddy current vibration-testing apparatus for nonferrous articles which has a wide range of control of the amplitude of self-excited resonant frequencies of the test specimen for both destructive and nondestructive tests.

Briefly, the present eddy current system for vibration testing of cantilevered nonferrous articles comprises: a blade-driving means consisting of a power amplifier actuated eddy current driver assembly; a vibration-sensing and feedback means consisting of a blade-vibration sensor, phase shift circuit, and an automatic amplitude control circuit; and a readout device to complete the apparatus. The device automatically "locks in" and follows the natural resonant frequency of the sample and selectively controls the amplitude of vibration of the sample by adjusting the feedback power level.

Other objects and many of the attendant advantages of the present invention will be apparent from the following detailed description of the invention.

BRIEF DESCRIPTION OF THE DRAWINGS

The single figure is a schematic diagram shown in two sections (FIG. 1a and 1b) of an eddy current-induced vibration test unit according to the present invention.

TECHNICAL DISCLOSURE

Figure 1A:
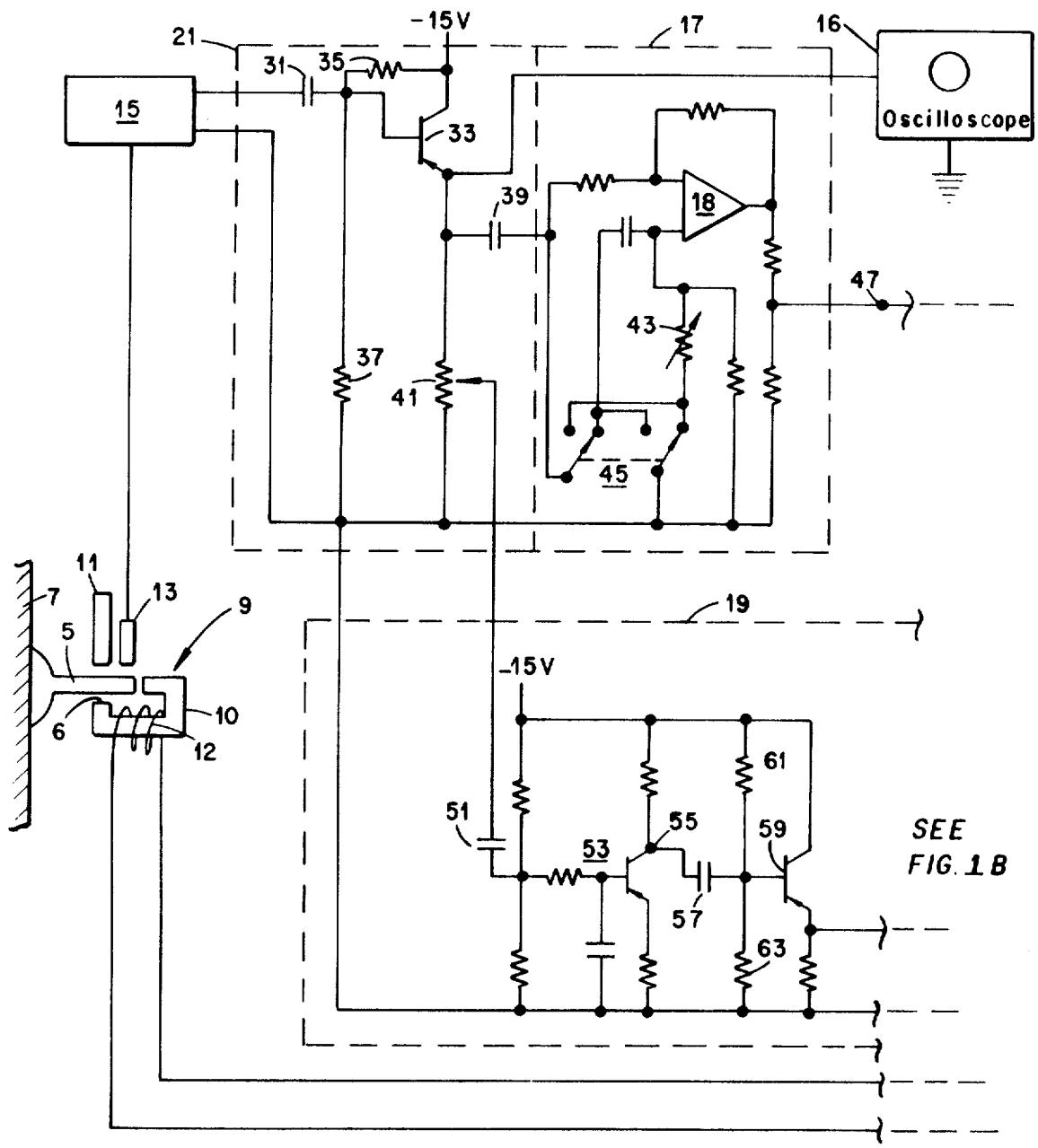
In FIG. 1a, a typical test specimen, such as an aluminum alloy compressor blade 5, is mounted in a support block 7 in cantilever fashion. An electromagnetic drive unit 9 is disposed adjacent the free end of blade 5 having a longitudinally disposed pole end 6 opposite a permanent magnet 11. A proximity sensor head 13 is located above a vibrating portion of the sample. The sensor 13 feeds a detector 15 whose output varies with the frequency and amplitude of the vibrating sample. The detector 15 feeds a phase shift circuit 17, a frequency measuring device, such as oscilloscope 16, and an automatic amplitude control circuit 19 (FIG. 1a and 1b) through an impedance matching circuit 21.

Referring now to the FIG. 1a, the drive unit 9, which preferably takes the form of a "half E" iron core 10 forming an L-shaped air gap and core windings 12, is oriented with the longitudinally disposed pole end 6 of core 10 parallel to the longitudinal axis of the blade 5, directly opposite permanent magnet 11. Magnet 11 works in conjunction with the drive unit 9 resulting in greater blade vibration than the prior art methods. The permanent magnet 11 (FIG. 1a) is positioned such that its magnetic pole is in opposition (repelling) to the AC magnetic component induced at the adjacent or longitudinally disposed pole 6 of the drive unit 9 by each half cycle of the rectified output of amplifier 25. The resultant repulsion produces a spreading effect of amplifier 25. The resultant repulsion produces a spreading effect of the magnetic lines of force and a net increase in the pulsating magnetic lines cutting through the nonferrous specimen. Eddy current induction in the specimen produces a third magnetic component which is always in opposition (repelling) to the combined magnetic fields of the permanent magnet and the AC magnetic field of the driver pole. Two basic facts are evident and apply to eddy current vibration systems: (1) any force that can be imparted to a nonferrous specimen by magnetic induction is a direct and sole result of magnetic repulsion, (2) with sinusoidal driving power some means must be devised to utilize only one-half cycle to maintain identical blade vibration frequency and driving frequency. The only permanent magnet that retained sufficient strength in practice was a highly coercive commercially available ceramic magnet. Since the ceramic magnet is nonconductive, there are no eddy currents induced into the magnet which tends to demagnetize a conductive magnet.

Sample blade 5 is fixedly attached to the high mass mount 7 and is disposed between magnet 11 and drive unit 9 approximately as shown in FIG. 1a for vibration in the bending mode. The proximity sensor head 13 is located above a vibrating portion of the blade 5. Sensor head 13 is the sensing element of a commercially available proximity detector 15, such as the Bently Nevada Corporation Model Number D-177, the output of which is an AC signal having the same frequency as that of the blade and an amplitude proportional to the amplitude of vibration of the blade.

The control circuitry of the subject invention is represented by phase shift circuit 17 and automatic amplitude circuit 19. These operate together to provide the control signal to amplifier 23. Considering now the control circuitry in more detail, the output of detector 15 is connected through a coupling capacitor 31 to the base of transistor 33. Transistor 33, together with its biasing resistors 35 and 37, provides impedance matching between detector 15 and the phase shift circuit 17. The signal from the emitter of transistor 33 takes two paths: the full signal is applied to phase shift circuit 17 through coupling capacitor 39, and a portion of the signal is taken from the adjustable arm of a potentiometer 41 connected in the emitter circuit to be applied as an input signal to an amplifying section of the automatic amplitude control circuit 19.

Considering now the phase shift circuit 17, a selectable phase shift of a full 360° is provided. Circuit 17 is a conventional phase shift circuit including a operational amplifier 18 used as a phase shifter. A more complete description of the phase shifter may be had by referring to "Electronics Design," Vol. 15, No. 4 (1967) pp. 114–116. A range of 180° is provided by control potentiometer 43. If the desired phase shift cannot be obtained within this range, an additional 180° range is provided by double-pole double-throw switch 45. The feedback signal thus appears at point 47 leading or lagging the blade vibration by the desired amount necessary to optimize the excitation of vibration. The AC signal at 47 is applied through a coupling capacitor 49 to the automatic amplitude control circuit 19 for purposes to be described later.

Figure 1B:
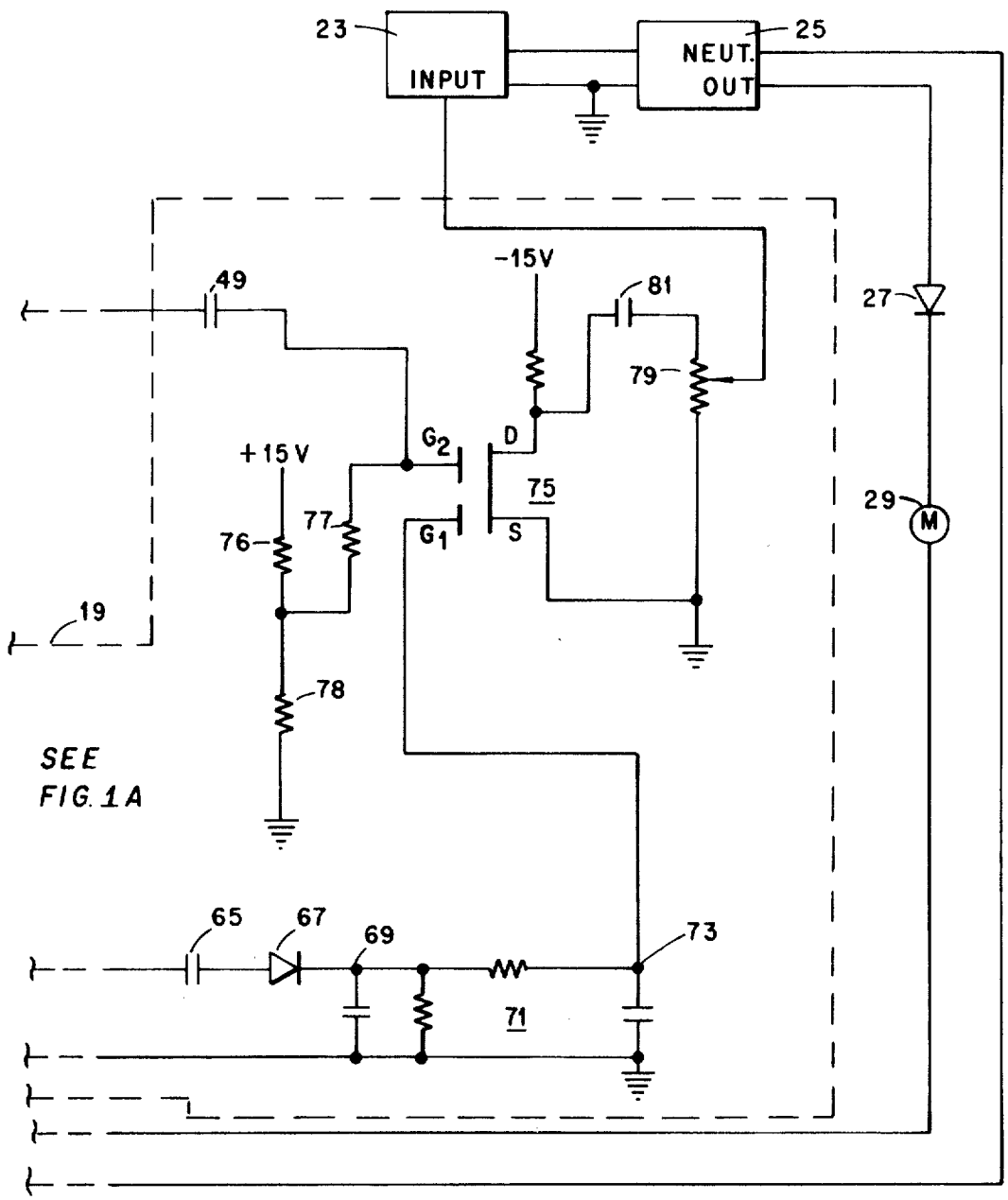
As shown in FIG. 1b, the amplitude control circuit 19 controls the amplitude of the output signal form phase shifter 17 in accordance with the amplitude of vibration of the sample blade and the controlled output is fed back to the drive coil 12 through amplifiers 23 and 25, half-wave rectifier 27 and ammeter 29.

Considering now the action of the automatic amplitude circuit 19 (FIG. 1a and 1b ), the previously mentioned signal from potentiometer 41 is applied to automatic amplitude control circuit 19 through a coupling capacitor 51 to an AC amplifier circuit consisting of a transistor amplifier 53 wherein the signal is amplified and appears at point 55. An amplification of 10 is typical. The amplifier signal is fed through a coupling capacitor 57 to an impedance matching circuit consisting of transistor 59 and biasing resistors 61 and 63. The output of the impedance matching circuit taken at the emitter of transistor 59, is fed through a coupling capacitor 65 (FIG. 1b) to the anode of a diode 67. Diode 67 functions as a half-wave rectifier resulting in a pulsating DC signal at point 69. This signal is fed through an AC filter 71 to provide a DC control signal taken at point 73. The signal from point 73 is placed on the source gate ($G_1$) of a dual gate field effect transistor 75 (F.E.T.) which operates as an amplitude regulator.

Referring back to the phase adjusted AC feedback signal applied to the coupling capacitor 49, this signal is applied to the drain gate ($G_2$) of F.E.T. 75. Resistors 76, 77, and 78 supply the operating bias to F.E.T. 75. F.E.T. 75 functions automatically, tending to reduce the output (drain) as the DC signal from point 73 increases and, conversely, tending to increase the output signal as the signal from point 73 decreases. Therefore, the drain output of F.E.T. 75 is an AC signal controlled in accordance with the amplitude of vibrating of the test specimen 5. The feedback loop gain is adjustable by means of a potentiometer 79 connected across the output of F.E.T. 75 in series with a blocking capacitor 81. A particular gain setting is made to provide enough loop gain for spontaneous startup and ensure fidelity of the amplitude control feature. To complete the feedback arrangement the feedback signal from the adjustable arm of potentiometer 79 is applied to preamplifier 23. The output of amplifier 23 is applied to the input of the power amplifier 25.

The output of power amplifier 25 may be fed through a silicon power diode rectifier 27 and the ammeter 29 to energizing winding 12 of the drive unit 9. Half-wave rectification is provided by diode 27 thereby applying a rectified drive signal to energizing coil. The power amplifier is typically a 750 VA amplifier which is capable of providing sufficient power to drive the test blade to destruction by fatigue. In recent development work on a higher power eddy current system it was found that rectification of the AC output was not absolutely necessary. However, in this case, the permanent magnet "enhancer" is mandatory to cause blade and drive frequency equality. With the permanent magnet in place (either N or S pole presented to the driver pole) and full wave power fed to the driver, one must assume that the AC magnetic component of one-half cycle is repelled and the other aided by the permanent magnet. This produces similar results to rectification and avoids the need of a very high power rectifier in this higher power system. Correct phase angle optimization is required by either method.

Readout information is obtained as follows: drive current is read from the ammeter 29, and the blade frequency is read from the oscilloscope 16 or a frequency counter connected to the emitter of transistor 33.

In operation the drive unit 9 is positioned with respect to the cantilevered test specimen depending on the type of vibration study desired. As shown in the figure, the coil is positioned so as to produce a bending vibration in the test blade. One leg of the "half E" drive unit is positioned adjacent the end of the blade and the other end along the longitudinal axis of the blade to form an air gap between each leg and the blade. The permanent magnet 11 is then positioned adjacent the side of the blade directly opposite the longitudinally positioned leg 6 of the drive unit 9. The sensor 13 is positioned so as to best respond to the vibrating frequency of the blade and the system is energized. The blade is initially set into vibration by adjusting the potentiometer 43 to obtain the proper phase relationship and the potentiometer 79 to obtain the proper loop gain as discussed above. When proper phase and gain settings are made, the blade will start vibrating spontaneously. The system then picks up the vibration and maintains the natural frequency. Adjustments are made on the phase shift circuit potentiometer 43 and the feedback power level (potentiometer 41) to "lock in" the resonant frequency and maintain the desired amplitude, respectively.

The arrangement shown in the figure was used to drive certain long and intermediate length aluminum axial flow turbine blades to destruction by fatigue. In these tests, the sample blades were vibrated at a maintained high amplitude to destruction. The device was also used to maintain a vibrating blade in the first bending mode and the first torsional mode through a controlled heating and cooling cycle.

Since resonant frequency is a function of the blade temperature, it is desirable to vibrate the blade in a controlled temperature environment in order to obtain data as to the change in resonant frequency with respect to temperature. The present drive can be readily used to provide a direct readout of resonant frequency versus temperature through use of an auxiliary heater. The resonant frequency being a function of the blade temperature, and because of the instruments "lock-in" on and maintenance of natural frequency, an x–y recorder can be used to obtain a plot of resonant frequency versus temperature through a heating-cooling cycle of the blade.

Thus, it will be seen that a very versatile and efficient eddy current system for vibration testing of cantilever nonferrous articles has been provided which affords quietness of operation and ease of applying control of amplitude of the blade vibration.

What is claimed is:

1. An eddy current-induced vibration testing device for automatically maintaining and controlling the amplitude of self-excited resonant frequency vibration of nonferrous cantilevered articles, comprising:

means including a high mass mount for holding said article to be vibrated in a cantilevered fashion;

an electromagnet having first and second pole ends positioned relative to the free end of said article so as to form an air gap between each of said pole ends and said article to induce eddy currents in said article;

a permanent magnet having one pole end disposed adjacent one side of said article diametrically opposed to one of said pole ends of said electromagnet disposed adjacent an opposite side of said article so as to induce vibration in said article upon actuation of said electromagnet;

a vibration sensing transducer having an AC signal output whose frequency is equal to the frequency of vibration of said article and proportional in amplitude to the amplitude of vibration of said article;

a variable phase-shifting circuit connected to the output of said transducer;

a converter circuit coupled to the output of said transducer for providing a DC control voltage proportional to the amplitude of vibration of said article at an output thereof;

an amplitude regulator circuit including a dual gate field effect transistor having a source, drain, and first and second gate electrodes, said first gate electrode connected to the output of said converter circuit, said second gate electrode coupled to the output of said phase-shifting circuit and said source electrode connected to ground potential so that a signal at the output of said drain electrode is an AC signal whose amplitude is regulated in accordance with said DC control voltage;

a power amplifier having an input coupled to said drain electrode of said transistor and an output connected to said electromagnet; and means for selectively controlling the amplitude of the input signal to said converter circuit, thereby selectively controlling the desired amplitude of vibration of said article.

2. An eddy current-induced vibration testing device as set forth in claim 1 further including a diode rectifier connected in series with the output of said power amplifier for providing a pulsating drive signal to said drive unit, an ammeter connected in series with said diode for monitoring the amplitude of the current supplied to said drive unit, and a frequency monitoring device coupled to the output of said sensing transducer for monitoring the frequency of vibration of said article.

3. An eddy current-induced vibration testing device as set forth in claim 1 wherein said nonferrous article is an aluminum alloy compressor blade and said electromagnetic field eddy current generator includes an iron core generally in the configuration of a "half-E," forming a generally L-shaped air gap, said core being positionable about the free end of said blade so as to cause the magnetic flux lines between the pole ends of said core to flow through said blade.

4. An eddy current-induced vibration testing device as set forth in claim 3 wherein said permanent magnet is composed of a highly coercive nonconductive material.